United States Patent [19]
Fletcher

[11] 3,951,222
[45] Apr. 20, 1976

[54] LIGHTWEIGHT AUTOMOBILE

[76] Inventor: Maurice C. Fletcher, 4600 Roxbury Road, Corona Del Mar, Calif. 92625

[22] Filed: Dec. 23, 1974

[21] Appl. No.: 535,160

[52] U.S. Cl.............................. 180/1 R; 180/44 F; 180/66 R; 280/700; 296/1 S
[51] Int. Cl.².................. B60K 26/00; B62D 25/00
[58] Field of Search................. 180/1 R, 44 R, 44 F, 180/66 R; 296/1 S, 28 R, 31 R; 280/112 A, 124 A, 124 B

[56] References Cited
UNITED STATES PATENTS

| 1,567,876 | 12/1925 | Turner | 296/28 R |
|---|---|---|---|
| 2,027,913 | 1/1936 | Kneale | 296/28 R X |
| 2,037,942 | 4/1936 | Stalker | 296/1 S |
| 2,128,686 | 8/1938 | Andreau | 296/1 S |
| 2,393,324 | 1/1946 | Joy | 180/66 R |
| 2,612,964 | 10/1952 | Hobbs | 296/28 R |
| 3,425,741 | 2/1969 | Korff | 296/1 S |
| 3,476,200 | 11/1969 | Schoepe et al. | 180/44 R |
| 3,776,587 | 12/1973 | Oxlade | 296/1 S |

FOREIGN PATENTS OR APPLICATIONS

| 976,892 | 12/1964 | United Kingdom | 280/112 A |

Primary Examiner—M. H. Wood, Jr.
Assistant Examiner—John A. Pekar
Attorney, Agent, or Firm—Christie, Parker & Hale

[57] ABSTRACT

An conventional size automobile having lightweight monocoque construction with the outer skin shaped to form a clean external body envelope. Forces due to air flow around the body shape are used to stabilize the designed vehicle load at desired speeds. The angle of attack of the body through the air can be regulated by individual adjustment at each of the four wheels in the vertical position of the vehicle body. Unsprung weight is reduced by providing individual hydraulic drive on each of the four wheels. The hydraulic drive system also operates as a braking system.

11 Claims, 8 Drawing Figures

U.S. Patent April 20, 1976 Sheet 1 of 4 3,951,222
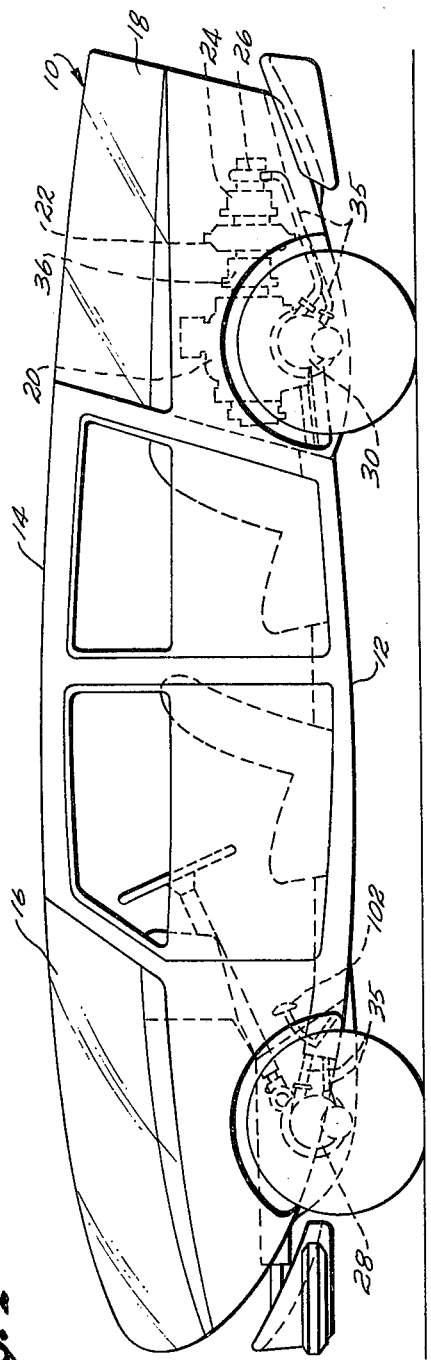
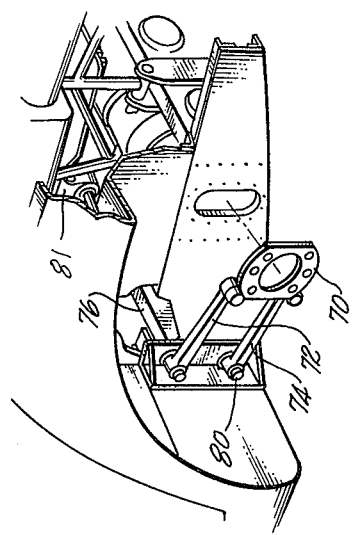
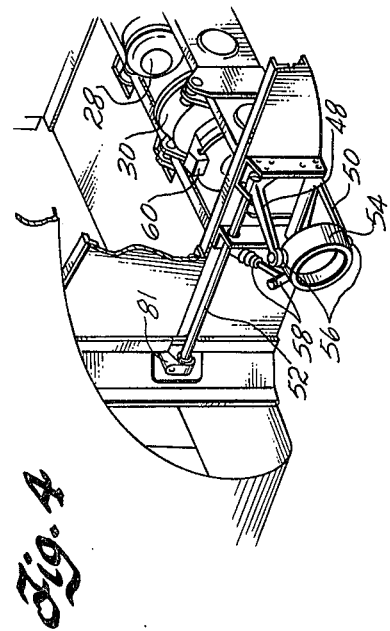

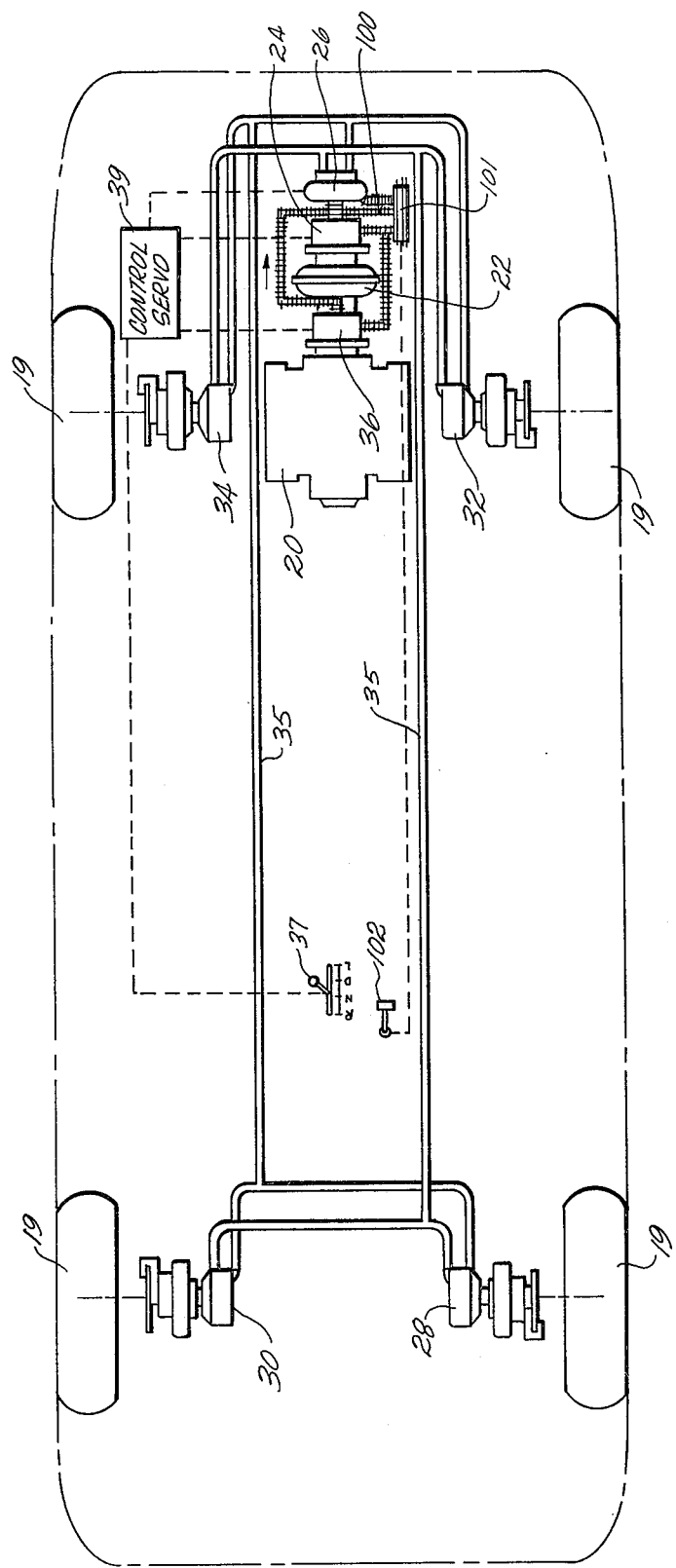

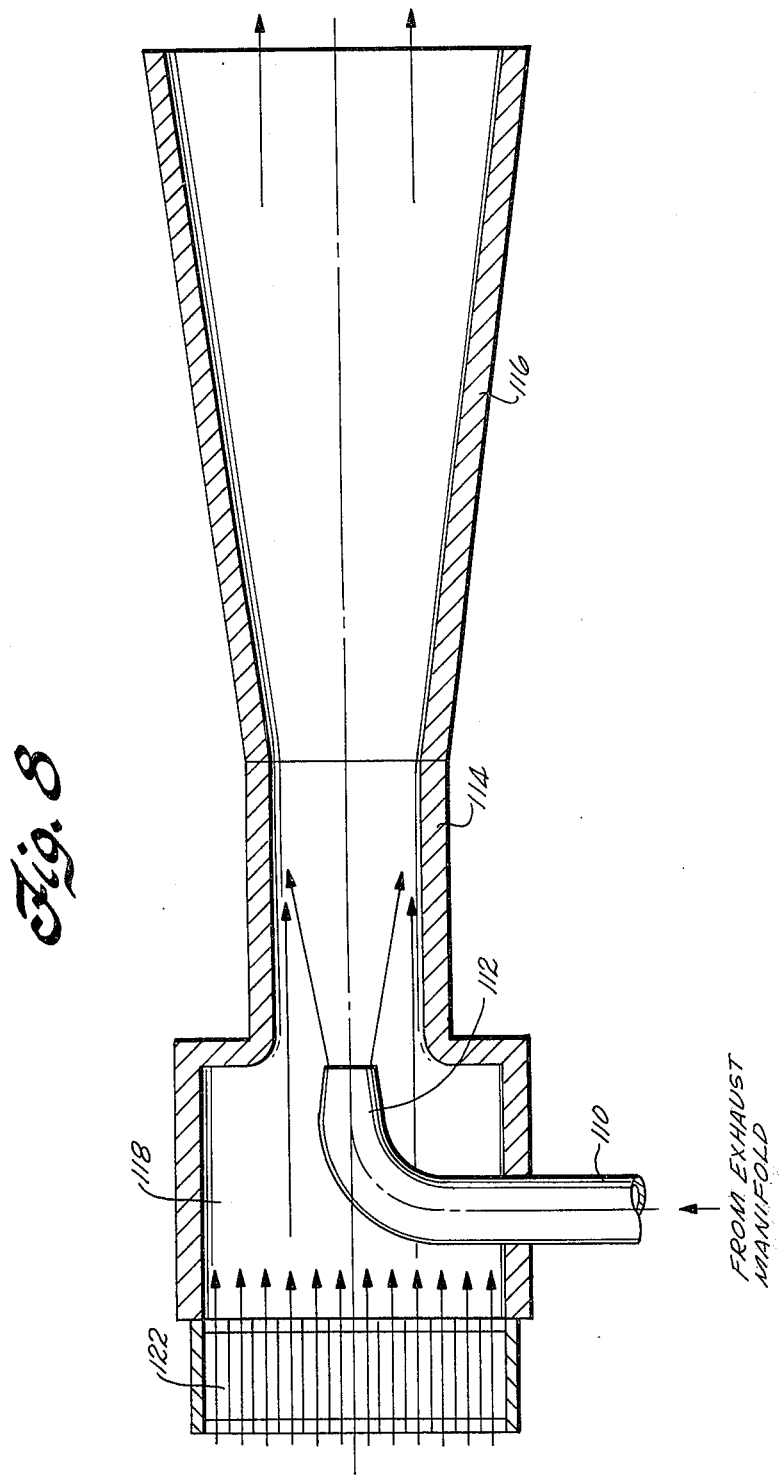

LIGHTWEIGHT AUTOMOBILE

FIELD OF THE INVENTION

This invention relates to motor vehicles, and more particularly, to a lightweight engine-powered vehicle providing high efficiency.

BACKGROUND OF THE INVENTION

With the rapidly increasing cost of fuel and the need for conservation measures, there is a need for vehicles which combine high performance with maximum fuel economy. The best way to reduce fuel consumption of course is to reduce weight and drag. However, the weight reduction must be accomplished without sacrifice of structural safety for the passengers. The reduction in weight must also be accomplished without sacrifice in stability at all operating speeds and without sacrifice in riding qualities. In the past, attempts to provide lightweight automobiles has resulted in vehicles that were deficient in one or more of the following characteristics: relatively poor riding comfort, excessive deflection and poor tracking in crosswinds, instability in maneuvering under emergency conditions, and inadequate protection for the passengers in a collision.

SUMMARY OF THE INVENTION

The present invention is directed to an improved automotive vehicle which is characterized by its extremely light weight in relation to the weight of the passengers and cargo. The reduction in weight is accomplished without sacrifice size or in structural strength by utilizing a vehicle designed to aircraft standards with an aircraft type design, using monocoque stressed skin type of construction. Drag is substantially reduced by aerodynamic design and by eliminating the conventional transmission, drive shaft, front and rear axle, and brake system and the air turbulance caused in cooling these parts. The body is designed to not only reduce drag but to enhance the ride and stability characteristics by dynamically increasing the effective ratio of sprung to unsprung weight of the vehicle when it is in motion. The vehicle attitude is adjustable at each wheel to vary the angle of attack fore and aft and to compensate for lateral side loads by changing the roll angle. The ratio of sprung to unsprung static weight is further enhanced by a hydraulic drive system with hydraulic motors at all four wheels, the motors being directly supported on the vehicle body to reduce the unsprung weight to a minimum. Braking is also done through the hyraulic system, eliminating the need for individual brakes on the wheels, and thereby further reducing the unsprung weight.

These and other advantages of the present invention are achieved by providing an automobile of monocoque construction in which the outer skin is stressed and structurally replaces the conventional automobile frame. The four wheels are individually driven by hydraulic motors which are supported on the vehicle body. The weight of the vehicle is transferred to the wheels through torsion springs with individual servo-controlled adjustment of the preloading of each spring to adjust the attitude of the body relative to the wheels along the pitch and/or roll axes. An engine, transmission and hydraulic pumps are supported as a unit in the body substantially over the rear wheels. Air flow for cooling the engine, either by means of a heat exchanger and liquid coolant or by direct air cooling, utilizes the exhaust passing through an ejector type pump which draws fresh air in as a coolant thereby utilizing the waste energy of the exhaust to provide cooling of the engine and hydraulic system. The complete combustion of the exhaust with the coolant air reduces pollutants, replaces the necessity of the oridinary muffler, and reduces the drag inherent in the usual ram-type cooling system.

DESCRIPTION OF THE DRAWINGS

For a more complete understanding of the invention, reference should be made to the accompanying drawings, wherein:

FIG. 1 is a side elevational view of the vehicle;

FIG. 4 is a perspective view of the front wheel suspension;

FIG. 5 is a perspective view of the rear wheel suspension;

FIG. 7 is a schematic view of the hydraulic drive system; and

FIG. 8 is a cross-section of the cooling ejector pump.

DETAILED DESCRIPTION

Figure 3:
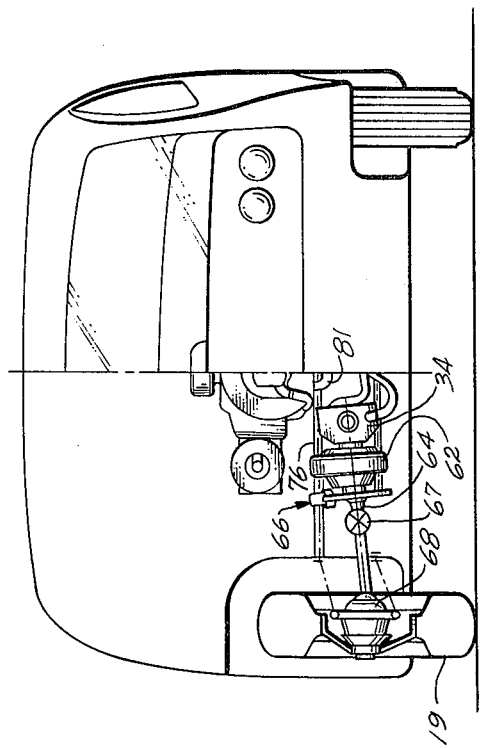
FIG. 3 is a rear view partially cut away to show the rear wheel drive.

Referring to the drawings in detail, the numeral 10 indicates generally the body of the vehicle. As seen in the elevational view of FIG. 1, the body is shaped to have no protuberances, scoops, slots or ram air ducts, so that air passes smoothly both under and over the body. The air passing over the clean body has less turbulent air drag along the bottom surface 12. Thus a downward force on the top surface 14 is produced on the body which increases the apparent sprung weight of the vehicle as the speed of the vehicle increases. The body of the vehicle is designed to aircraft standards utilizing monocoque construction in which the outer skin is an integral part of the load supporting framework. To accomplish a clean external body envelope and at the same time provide good fore and aft visibility, the upper front section of the vehicle, indicated at 16, utilizes an outer skin of transparent material, such as plexiglass. Similarly the upper rear section, indicated at 18, may also be made of a transparent skin material. Side windows are provided in the doors in conventional manner. While the body is shown as having an inverted airfoil shape, other aerodynamic shapes that produce a negative lift effect may be used.

To maintain the integrity of the clean body design, all usual drag producing protuberances have been eliminated or refined. Exposed front and rear axles, drive train, brakes and brake drums, and ram air ducts for cooling have all been eliminated. The four wheels 19 are mounted from the body, as hereinafter described in detail, with the upper periphery of the wheels recessed into the body. The drive system, including the engine, transmission and drive train to all four wheels, is enclosed within the body shell. Also, the braking system and the cooling systems are contained within the body shell. Independent suspension of all four wheels, hereinafter described in connection with FIGS. 4 and 5, includes torsion springs which are also protected by the body shell. Thus drag is reduced to an absolute minimum.

Considering the construction of the vehicle in more detail, a rear-mounted engine 20 of any suitable design, such as an air-cooled to water-cooled internal combustion engine, Wankel rotary engine, gas turbine, or other suitable prime mover, is mounted over the rear wheels. The output shaft from the engine 20 is coupled to the input of a hydraulic clutch and torque converter 22. The output of the torque converter drives a variable displacement hydraulic pump 24. Various types of variable displacement pumps are available and capable of handling the horsepower involved, such as vane type pumps or variable stroke piston type pumps, of both radial and axial designs. The variable displacement pump delivers hydraulic fluid at variable pressures over a wide range of volume rates, the hydraulic fluid being directed through a reversing valve 26 to fixed displacement hydraulic motors 28, 30, 32, and 34 associated respectively with each of the four wheels 19 of the vehicle. The hydraulic motors are mounted to the body frame within the outer shell. Fluid is circulated between the pump and the motors through suitable high pressure hydraulic lines, indicated generally at 35. The hydraulic lines 35 which can be made flexible and made to follow any available path between the pump and the motors, eliminate the need for a propeller shaft, differential and axial drive of conventional automobiles. The need of a differential is eliminated because the volume of hydraulic fluid to each motor balances automatically depending on the load. Accelerometers at each wheel control traction and skidding.

For start-up and low speed operation, a second variable displacement pump 36 is provided. The pump 36 is driven directly off the engine ahead of the torque converter 22 through a suitable gear reduction drive providing approximately a 2.4 to 1 reduction. The operation utilizes a manually operated control 37 corresponding to the conventional automatic transmission control. When the shaft lever is down-shifted into the low speed position, it operates to declutch the torque converter 22. The fluid from the pump 36 is connected through the suitable check valves to bypass the high-speed pump 24.

The reversing valve 26 is also tied to the shift control to provide a reverse direction of flow to the wheel driving hydraulic motors when the control lever is put in reverse. When in a neutral position, the reversing valve blocks the flow of fluid between the pump and the motors. When shifting between forward and reverse a metered bypass prevents hydraulic lock which could cause damage if the automobile is moving during the shifting operation. A detent at the hydraulic lock position of the valve for parking is provided.

Adjustment of pump displacement for both pumps 24 and 36 is provided by a control servo 39. The control servo may be a conventional hydraulic control such as used in standard automaic transmissions. Such a control system is described in *Autmotive Mechanics*, McGraw Hill, Inc., 1970, 6th Edition, page 442. The servo system responds to engine manifold pressure and output shaft speed of the drive motors. The latter control may be by a suitable governor driven off the output shaft of one of the motors. The servo control at low speeds from 0 up to 15–25 miles an hour increases the volume output of the pump 36 up to its maximum value, while the pump 24 is set to 0 output, thereby providing substantially no load on the torque converter. With depression of the throttle changing the manifold vacuum pressure, the slide block of variable pump 36 is opened to increase the displacement gradually until the governor indicates the speed has come up to the correct speed to switch operation over to the pump 24. At this point the servo control reduces the displacement of the low-speed pump 36 back to zero while increasing the output of the high-speed pump 24 up to the desired speed determined by the throttle setting.

Figure 2:
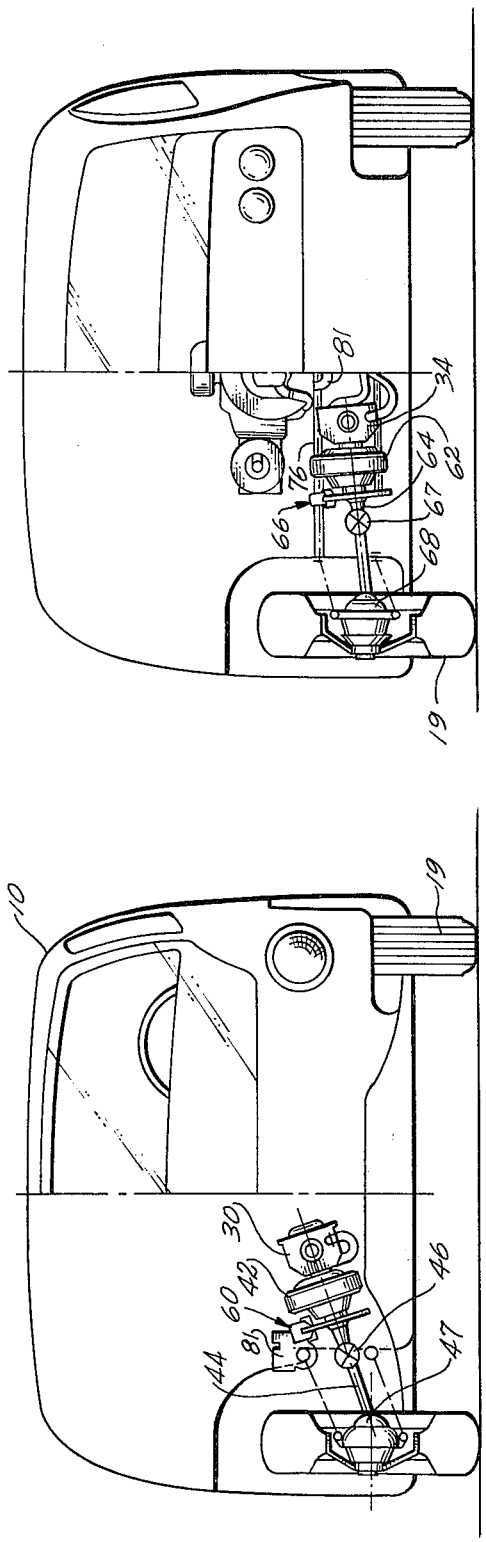
FIG. 2 is a front view partially cut away to show the front wheel drive.

Referring to FIG. 2, the drive of the front wheels is shown in more detail. The hydraulic motor 30, which is mounted as part of the sprung weight inside the body shell of the vehicle, is coupled to one of the front wheels 19 through a reduction gear unit 42. An output drive shaft 44 from the gear reduction unit 42 is coupled to the wheel 19 through constant velocity universal joints 46 and 47 in the manner of known front wheel drive vehicles.

As shown in the detailed perspective view of FIG. 4, the front end suspension includes upper and lower control arms 48 and 50. The lower arm 50 is hinged from the frame of the body while the upper arm 48 is connected to a torsion bar 52. Bearing support for the axle and universal joint is provided by a collar 54 which is rotatably supported for steering between the upper and lower arms 48 and 50 by standard ball joints 56. Steering is applied by rotation of the collar 54 in the ball joint suspension through conventional steering linkage indicated at 58. An inboard disk brake, indicated generally at 60, is provided on the output shaft adjacent the gearbox 42 inside the body of the vehicle.

A similar suspension and drive arrangement is provided for the rear wheels as shown by the detailed in FIG. 3. The hydraulic drive motor 34 is mounted inboard of the vehicle within the body, the output of the motor being coupled directly through a reducing gearbox 62 to an output drive shaft 64. A disk brake, indicated generally at 66, is positioned adjacent the output of the gearbox 62. The shaft 64 is coupled to the associated rear wheel through a pair of universal joints 67 and 68.

The universal joint 68 in turn is journaled in a vertically moving collar 70 supported by a pair of radius arms 72 and 74. The arm 72 is connected to the end of a transverse torsion bar 76 anchored at one end of the frame. The lower arm 4 is pivoted to the frame as indicated at 80.

Figure 6:
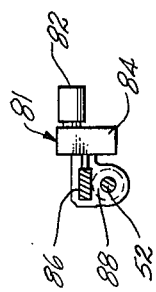
FIG. 6 is a detailed view of the suspensions adjusting drive assembly.

One of the features of the present vehicle is that the torsion bar spring associated with each of the wheels is anchored to the body through an attitude adjusting drive assembly 81 which is shown in detail in FIG. 6. This includes a electric drive motor 82 and reduction gear train 84. The output of the reduction gear train 84 rotates the associated torsion bar 52 through a worm gear 86 and helical gear 88. By operating the motor 82, the end of the associated torsion bar is rotated. This operates to raise or lower the body relative to the associated wheel under a given load condition. By providing suitable sensors and servo controls on each of the four wheel suspensions, the angle of attack of the body structure is adjustable to compensate for different wind conditions and different load conditions.

While disk brakes are shown on each of the wheels, these brakes are used only for parking and emergency stopping. Normally they provide less than 15 percent of the braking needs and therefore give off relatively little heat, permitting them to be mounted inside the body shell. The primary braking effort is provided through the hydraulic motors 28, 30, 32 and 34. In a stopping situation where the wheels are being turned by the momentum of the vehicle, these motors operate as pumps, thereby putting energy into the hydraulic system. However, the variable displacement pumps do not function as motors to transmit energy back into the engine. Therefore a regulated bypass 100 is provided in the system. (See FIG. 7) A valve 101 which is controlled from the brake pedal, indicated at 102, varies the resistance to flow through the bypass. Thus, in operation, when the operator's foot is removed from the accelerator pedal, causing the engine to slow down and the volume of the fluid from the pumps to decrease, the bypass valve 100 permits recirculation of fluid by the drive motors acting as pumps. By depressing the brake pedal 102, the resistance to fluid flow is increased, thereby increasng the back pressure on the drive motors and acting to slow the vehicle.

To provide cooling for the engine, the hydraulic transmission system, and the braking system, an ejector pump (see FIG. 8) using exhaust gases is utilized. Exhaust gases from the exhaust ports of the engine are connected through a nozzle 110 ending in a jet 112, which directs the exhaust gases at high velocity through the throat portion 114 of the ejector pump. The exhaust gases then mix with the cooling air to complete the combustion, oxidizing the pollutants in the exhaust and expanding through the diverging diffuser section 116. The high velocity in the throat section produces a substantially reduced pressure, thereby drawing fresh air in through a plenum section 118 of the ejector pump. The plenum section is connected to a shroud for drawing air across the engine, in the case of an air-cooled engine. The pump may also be used to draw air through a radiator or other heat exchanger 122 where the engine and other parts are liquid cooled. The internal walls of the ejector pump may be lined with sound-deadening material so that the pump functions also as the muffler. By utilizing the energy of the exhaust gases through an ejector pump, the use of the conventional radiator with ram cooling by movement of the vehicle through the air is eliminated along with the conventional fan, both of which contribute greatly to the drag, noise and loss of overall efficiency of conventional automobiles. A similar exhaust ejector pump may be used to cool the hydraulic fluid in the hydraulic drive and braking system by moving the fluid through the heat exchanger 122. The ejector pumps are positioned to exhaust directly out the rear of the vehicle.

What is claimed is:

1. An automobile vehicle comprising a body having an internal framework and a stressed outer shell attached to the framework, the shell having an aerodynamic shape to provide negative lift when moving through air to increase the effective weight, a plurality of wheels partially recessed into the body, independent spring suspension means supporting the body on each of the wheels, means supported inside the body shell for driving and braking the vehicle through the wheels, means associated with each wheel suspension means for independently adjusting the level of the body relative to the ground at each wheel.

2. The vehicle of claim 1 wherein the driving and braking means includes an engine mounted within the body, and an ejector pump driven by exhaust from the engine, the ejector pump drawing air into the body shell to cool the engine.

3. The vehicle of claim 2 wherein the driving and braking means includes a plurality of hydraulic motors mounted inside the body shell directly to the body, the weight of the motors being transferred from the body to the wheels through the spring suspension means, drive means coupling the motor to respective ones of the wheels, hydraulic pump means, and means coupling the engine to the pump means for driving the respective motors.

4. The vehicle of claim 3 wherein the pump means includes first and second variable displacement hydraulic pumps, said coupling means including a direct gear reducing drive coupling the first pump to the engine, and further including a hydraulic torque converter coupling the second pump to the engine.

5. The vehicle of claim 4 further comprising dynamic braking means, the brake means including by-pass valve for bypassing the pumps and recirculating hyraulic fluid through the motors, and means operated by a brake pedal for varying the flow resistance of the by-passed fluid to vary the load on the motors.

6. A lightweight automobile comprising: a monocoque body having an aerodynamic shape forming a smooth continuous top and bottom surfaces, four wheels, means independently suspensing the wheels from the body including spring means between the wheels and the body for transferring the weight of the body to the wheels, four drive assemblies connected respectively to the four wheels and positioned inside the shell of the monocoque body, and means supporting the weight of each drive assembly directly from the body, whereby the weight of the assemblies is transferred to the wheels through the spring means, the drive assemblies including drive shafts to the associated wheels for rotation of each wheel, each drive assembly including a motor and a gear drive transmission means coupling the motor to the associated wheel.

7. Apparatus of claim 6 further including means associated with each wheel suspension means for adjusting the level of the body relative to the ground at each wheel.

8. Apparatus of claim 6 further including an engine mounted within the body, and a ejector pump driven by exhaust from the engine, the ejector pump pumping air into the body shell to cool the engine.

9. Apparatus of claim 8 wherein said motors are hydraulically driven, hydraulic pump means coupled to the engine, and means hydraulically coupling the motors to the pump means.

10. Apparatus of claim 8 wherein the pump means includes first and second variable displacement hydraulic pumps, said coupling means including a direct gear reducing drive coupling the first pump to the engine, and further including a hydraulic torque converter coupling the second pump to the engine.

11. An automobile vehicle comprising a body having a stressed outer shell, a plurality of wheels partially recessed into the body, independent spring suspension means supporting the body on each of the wheels, drive means for adjusting the body vertically relative to each wheel to change the attitude of the body relative to the air stream when the vehicle is moving, an engine mounted within the body, an ejector pump driven by exhaust from the engine, the ejector pump pumping air into the body shell to cool the engine, a plurality of hydraulic motors mounted inside the body shell, drive means coupling the motor to respective ones of the wheels, hydraulic pump means, means coupling the engine to the pump means for driving the respective motors, the pump means including first and second variable displacement hydraulic pumps, said coupling means including a direct gear reducing drive coupling the first pump to the engine, and further including a hydraulic torque converter coupling the second pump to the engine.

* * * * *